(12) United States Patent
Guo

(10) Patent No.: US 10,859,900 B1
(45) Date of Patent: *Dec. 8, 2020

(54) LIQUID CRYSTAL DISPLAY PROJECTOR

(71) Applicant: NANHUA INTELLIGENT PRECISION MACHINE (SHENZHEN) CO., LTD., Shenzhen (CN)

(72) Inventor: Hanwen Guo, Chengdu (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/689,090

(22) Filed: Nov. 20, 2019

(30) Foreign Application Priority Data

Jun. 5, 2019 (CN) .......................... 2019 1 0490596

(51) Int. Cl.
*G03B 33/08* (2006.01)
*G03B 21/20* (2006.01)
*G03B 21/00* (2006.01)

(52) U.S. Cl.
CPC ........... *G03B 33/08* (2013.01); *G03B 21/006* (2013.01); *G03B 21/2013* (2013.01); *G03B 21/2033* (2013.01)

(58) Field of Classification Search
CPC .. G03B 33/08; G03B 21/006; G03B 21/2013; G03B 21/2033
See application file for complete search history.

(56) References Cited

U.S. PATENT DOCUMENTS

| 6,388,718 | B1 | 5/2002 | Yoo et al. | |
| 6,771,233 | B1* | 8/2004 | Kim | H04N 9/3114 345/32 |
| 6,905,211 | B2* | 6/2005 | Fujita | H04N 9/3105 348/E9.027 |
| 9,851,630 | B2* | 12/2017 | Kang | G02B 3/0043 |
| 2002/0089612 | A1 | 7/2002 | Okada et al. | |
| 2003/0011752 | A1* | 1/2003 | Ikeda | H04N 9/3105 353/31 |
| 2004/0207823 | A1* | 10/2004 | Alasaarela | H04N 13/337 353/122 |
| 2005/0259225 | A1* | 11/2005 | Greenberg | G02B 27/1026 353/31 |
| 2009/0310086 | A1* | 12/2009 | Li | H04N 9/3111 353/20 |
| 2010/0214497 | A1 | 8/2010 | Fujisaki et al. | |
| 2014/0160364 | A1* | 6/2014 | Katou | G03B 21/204 349/5 |

FOREIGN PATENT DOCUMENTS

| CN | 107153320 A | 9/2017 |
| CN | 110262169 A | 9/2019 |

* cited by examiner

*Primary Examiner* — Jia X Pan
(74) *Attorney, Agent, or Firm* — Erson IP (Nelson IP)

(57) ABSTRACT

Provided is an LCD projector. The LCD projector includes including a first LCD (liquid crystal display) light valve module and a second LCD light valve module. The first LCD light valve module simultaneously provides a red field image and blue field image in space, and the second LCD light valve module provides complete green field image. The red field pixel of the first LCD light valve module and the corresponding pixel of the second LCD light valve module coincide in space to generate a yellow image. The blue field pixel of the first LCD light valve module and the corresponding pixel of the second LCD light valve module are coincided in space to generate a cyan image. White and full-color images are reproduced by yellow and cyan lights.

2 Claims, 1 Drawing Sheet

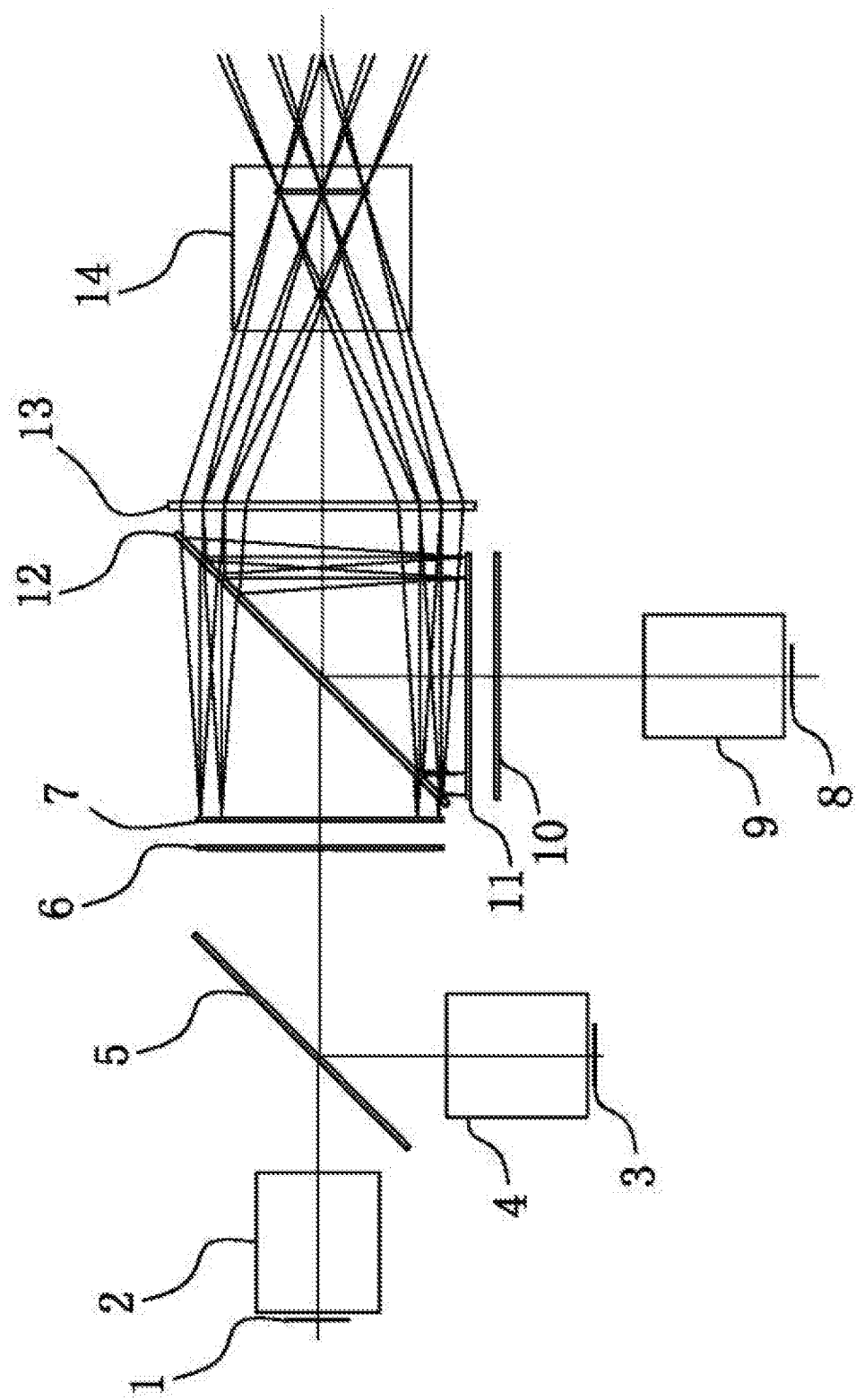

LIQUID CRYSTAL DISPLAY PROJECTOR

CROSS-REFERENCE TO RELATED APPLICATIONS

This application claims priority to Chinese Patent Application No. 201910490596.0 with a filing date of Jun. 5, 2019. The content of the aforementioned applications, including any intervening amendments thereto, are incorporated herein by reference.

TECHNICAL FIELD

The disclosure relates to a two-piece LCD (liquid crystal display) projector.

BACKGROUND OF THE PRESENT INVENTION

For, a long time, people habitually classify projectors based on characteristics of a light valve, one of the most core devices of the projector in general, such as a DLP (digital light processing) projector, an LCD (liquid crystal display) projector, an LCOS (liquid crystal on silicon) projector, which are common at present.

The common LCD projectors refer to having two characteristics: the light valve adopts an LCD technology (for distinguishing DLP) and is of a transmission type (for distinguishing LCOS). The LCD projector generally has two principles and structure forms of a single LCD projector and a 3LCD projector. The general single LCD projector reproduces space color images under the irradiation of a white light source or an equivalent white light source by using a full-color LCD light valve. The general 3LCD projector uses three single-color (black and white) LCD light valves, that is, there is no CF (color filter) device used by the single LCD projector light valve on the LCD light valve, three paths of LCD light valves are illuminated by red, green and blue three primary lights, three LCD light valves each display a primary color field image, and finally the images, generated by the three light valves are coincided, so as to generate the space color image just like the single LCD projector applying the full-color LCD light valve.

The single LCD projector is low in cost and simple in production, has brightness ranging from more than ten lumens to three or four hundred lumens, and has certain practicability and competitiveness; the 3 LCD projector has rich color, good picture quality and high brightness, but has cumbersome production, high access threshold, high cost and brightness ranging from 800 to 8000 lumens, and is a main product in the traditional commercial and educational projector market.

The biggest disadvantage of the single LCD projector is that the "energy conversion efficiency" $\eta$ is too low. Generally, $\eta$ is defined as: $\eta$=[output brightness (Lm)/input electric power (w)/100 (Lm/w)*100%], in which the LED light efficiency is calculated according to the typical value 100 Lm of the high-power LEI) module at present, and, the $\eta$ of the single LCD projector is only about 2%-3.5%, while the $\eta$ of 3LCD and DLP projectors using a UHF bulb, LED, laser and other light sources can generally easily reach 10% or even more than 25%.

The main reason for the low $\eta$ of the single LCD projector is that the efficiency of the full-color LCD light valve is too low, and is generally only about 4%~7%, which is determined by the polarizer, color film, TFT (thin film transistor) opening rate. The efficiency of the polarizer is about 35%~40%, the efficiency of CF is about 5%~21%, and the TFT opening rate is about 50%~70%. However, the dark areas of CF and TFT opening rate (such as black frame) are overlapped to a certain extent, and therefore the total efficiency of LCD module cannot be obtained by directly multiplying the above data.

Accordingly, the lowest-efficiency part among the components of the light valve of the single LCD projector is CF. Under the conditions that the wavelength bandwidths of R, G and B color filtering devices is not crossed and just separated, the highest theoretical efficiency is only 33.3%. That is to say, white light or equivalent white light is irradiated to the light valve of LCD, and the R-pixel therein absorbs green and blue light components through the red light in the white light occupied by this pixel component, the G pixel therein absorbs the red and blue light components through the green light in the white light occupied by this pixel, and the B pixel absorbs the red and green light components through the blue light in the white light occupied by this pixel, so the theoretical efficiency is $\frac{1}{3}$, namely 33.3%. Considering the actual situation, the efficiency of CF is far lower than this theoretical value, because when the above theoretical calculation is performed, areas occupied by shading device (for example black frame) around each pixel on the light valve is huge. How to improve the efficiency of the LCD light valve CF and then promote the output brightness of the projector is a key subject for researching and developing the performances of the single LCD projector for a long term.

There are many ways to simply improve the efficiency of CF, but the improvement of CF efficiency often brings various disadvantages, for example the opening rate of the color film is increased (i.e. the areas occupied by the black frame and other devices are reduced), and thus the contrast and color gamut are seriously affected; the thickness of the color film is reduced, and thus the accuracy and thermal stability of the color gamut and color are seriously affected; increasing the width and ratio of the wavelength bandwidth occupied by each RGB three-color colorful film is increased, for example, if the bandwidth of B is increased from 400-475 nm to 400-485 nm, meanwhile, the wavelength bandwidth of G is increased from 475-580 nm to 470-600 nm, and the bandwidth of R is increased from 580-800 nm to 560-800 nm, the CF efficiency is significantly increased, but the image effect deteriorates. Although the output brightness of the projector is significantly increased, people's perception of brightness increase is not obvious when playing color images, and serious image has serious distortion due to too poor color gamut and is not normally watched, so the improvement of the efficiency of CF and the achievement obtained after improvement of CF efficiency are usually contradictory, and traditional methods are difficult to innovate and break.

SUMMARY OF PRESENT INVENTION

The technical problem to be solved by the disclosure is to provide a two-piece LCD projector and an projection method, aiming at the fundamental technical problem that there serious contradiction between the improvement of the CF efficiency of the LCD light valve and the obtained achievement due to the low CF efficiency of the LCD light valve of the single LCD projector adopting the existing LCD light valve technology, so that the energy efficiency ratio of the projector is greatly improved, and meanwhile color effect, contrast and other Indexes are not scarified. The two-piece LCD projector is low in cost and high in cost performance, and has no higher requirements on the manufacturing industry chains of the most upstream CF and TFT of the existing LCD light valve module.

The technical solution adopted by the technical problem solved by the disclosure is to provide a two-piece LCD projector, including red, yellow, green, and blue three-color light sources, lights emitted, from the light sources, the lights emitted from the light sources pass through spotlighting devices corresponding to various light sources, the red and blue lights are converged by a red and blue light converging device to illuminate a first LCD light valve module, the green light separately illuminates the second LCD light valve module, the lights modulated by two LCD light valve modules are converged by a red, green and blue light converging device, the converged light passes through a field lens and a projection lens and finally the image of the LCD light valve module is projected to a curtain.

In some embodiments, the sizes of windows of the first and second LCD light valve modules are the same.

In some embodiments, the first LCD light valve module is a two-color LCD light valve with red and blue CF.

In some embodiments, the second LCD light valve module is a black and white LCD light valve without CF.

In some embodiments, the second LCD light valve module is an LCD light valve with only green CF.

The disclosure has the beneficial effects that by setting the first and second LCD light valves, the theoretical CF efficiency of the first LCD light valve module is increased from 33.3% of the original full-color LCD light valve module to 50% when being illuminated by the red and blue lights at the same time; the CF efficiency of the second LCD light valve module is, increased from 33.3% of the original, full-color LCD light valve module to 100% under the irradiation of green light, thereby significantly improving the energy conversion efficiency of the projector; at the same time, its technical platform is still the same as the single LCD projector, and has obvious advantages of simple structure, high cost performance and the like; there are no higher technology and equipment requirements for the upstream, manufacturing chain of the existing industrial chain, so the two-piece LCD projector has great practicability and complete feasibility.

DESCRIPTION OF THE DRAWINGS

Next, the disclosure will be further, described in conjunction with drawings and embodiments. In the drawing:

FIG. 1 shows a principle structure of a two-piece LCD projector according to the disclosure.

DETAILED DESCRIPTION OF PREFERRED EMBODIMENTS

Preferred embodiments of the disclosure will be described in, detail in, conjunction with drawings.

Referring to FIG. 1, FIG. 1 shows a principle structure of a two-piece LCD projector according to the disclosure. The two-piece LCD projector includes a red light source 1, a spotlighting device 2, a blue LED light source 3, a spotlighting device 4, a red and blue light converging device 5, a focusing lens 6, a first LCD light valve module 7, a green LED light source 8, a spotlighting device 9, a focusing lens 10, a second LCD light valve module 11, a red, green and blue light converging device 12, afield lens 13 and a projection lens 14, The basic principle of the two-piece LCD projector is as follows: lights emitted by the red LED light source 1 and the blue LED light source 3 are converged by respective spotlighting devices 2 and 4 and then reach the red and blue light converging device 5, the lights are converged by the red and blue light converging device 5 and then reach, the focusing lens 6 to illuminate the first LCD light valve module 7, the light is emitted to the red, green and blue light converging device 12 after being modulated by the first LCD light valve module 7; the light emitted by the green LED light source 8 passes through the spotlighting device 9 and then reaches the focusing lens 10 to illuminate the second LCD light valve module 11, the light is modulated by the second LCD light valve module 11 and then emitted to the red, green and blue light converging device 12; after the red, green and blue light converging device 12 converges the lights from the first and second LCD light valve modules 7 and 11, the converged light continues to be transmitted to the field lens 13 and the projection lens 14, the light passes through the projection lens 14 to be finally imaged on a screen.

Since the sizes of windows of the first and second LCD light valve modules 7 and 11 are the same, resolutions of video signals input to the first and second LCD light valves modules 7 and 11 are the same, corresponding areas of each red pixel provided by the first LCD light valve module 7 and corresponding each green pixel provided by the second LCD light valve module 11 are coincided in space to generate yellow light; corresponding areas of the blue pixel of the first LCD light valve module 7 and corresponding each green pixel provided by the second LCD light valve module 11 are coincided in space to generate cyan light; according to three primary color principle, yellow and cyan lights generate while light and full-color images, yellow+cyan=R+G+G+B, green is too much seemingly, but in practice, the brightness ratio of RGB colors in the white field of the projector is for example, generally about (0.25-0.3):1:(0.1-0.15), with the main wavelengths being 625 nm. 535 nm and 455 nm respectively. The RGB brightness ratio of the DLP projector with LED as the light source is generally about 1:8:1, with the main light source wavelengths being about 617 nm, 520 nm and 455 nm respectively. At present, when LED with the same chip size (light emitting area) is applied with rated equal current, the output luminous flux ratio of each LED in RGB is about 1:2.5:0.5, so when the projector with the LED light source is designed to improve the brightness, its bottleneck is always the brightness quantity level of the green light source, that is, the brightness of green light is never too much; a R+2G+B mode is also the standard light source duty ratio program of the DLP projector of the LED light source, that is, the driving current duty cycle of the R lamp is about 25%, the driving current duty cycle of the G lamp is about 50%, and the driving current duty cycle of the B lamp is about 25%. Therefore, the spatial proportion structure of R+G+G+B of the disclosure does not have a white balance problem when matching the LED light source.

LED light sources 1, 3 and 8 can select three primary color LED light source or white LED light source for three primary color light distribution. When three primary color LED light source is adopted, respective output luminous flux is controlled by controlling the power of each LED, and the reasonable choice of LED peak wavelength is noted, which can easily achieve high-quality white balance display; when the white LED light source is selected, white balance is achieved only when the areas of R and B pixels on the first LCD light valve module are equal; the area size of the LED light source is comprehensively determined by the Etendue of the first and second LCD light, valve modules 7 and 11, the Fno of the lens 14, the beam solid angle requirements of light converging devices 5 and 12 and the like.

One effect of the spotlighting devices 2, 4 and 9 is to converge lights emitted from the LED light sources 1, 3 and 8 and meet the solid angle requirements in the light transmission process; another effect is to meet uniform design illumination conditions on the first LCD light valve module 7 and the second LCD light valve module 11; considering the efficiency and cost of the light converging devices 5 and 12 of the two-piece LCD projector of the disclosure, the solid angle of the light irradiated to the light converging device The design of the light solid angle of the device is preferably designed within 7° at one side.

The red and blue light converging device 5 is realized by a two-way color glass plate using a vacuum coating technology.

The focus lenses 6 and 10 provide collimating illumination for the LCD light valve on the Kohler lighting device system; the LED light source image or sub-light source image separated from the light integrator of the illumination device on LCD light valve is focused on the window of the LCD light valve on the critical illumination device system; when the size of the LCD light valve is small (such as ≤3 inch), the focusing lenses 6 and 10 can select glass lenses to improve performance; when the size of the LCD light valve is large (such as 4-7 inches), the focusing lenses 6 and 10 select plastic Fresnel lens to reduce the cost.

The first and second LCD light valve modules 7 and 11 have the same size, but the first LCD light valve module 7 has two-color display and the second LCD light valve module 11 has single color display.

If it is desirable to output a higher brightness, the LCD light valve module is inevitably irradiated by a stronger light. At this moment, the polarizer on the incident side of the LCD light valve module is taken from the LCD glass and pasted on a separate glass plate, and use effective measures such as air cooling to heat, the polarizer and LCD light valve are subjected to heat dissipation using effective measures such as air cooling; no matter whether the spotlighting devices 2, 4 and 9 have devices containing PCS (polarization conversion system) functions or not, it is better to set a reflective polarizer in front (close to the LED light source direction) of the polarizer on the incident side of the LCD light valve module to improve the safety of the polarizer on the incident side of the LCD light valve module.

The light converging device 12 is realized by raw materials that can perform wavelength or vibration phase division, such as a dichroic plate, a PBS (polarization beam splitter) film is pasted on white or green plate glass to form a PBS module, or is achieved by the PBS prism. Only when the PBS device is used, for the light passing through the LCD light valve, the polarization axis is required to meet the working conditions of PBS.

The field lens 13 and the lens 14 project the images displayed on the first and second LCD light valve modules 7 and 11 onto the screen.

It should be understood that the above embodiments are only for explaining the technical solution of the disclosure but not limiting thereto. For those skilled in the art, the technical solution described in the above, embodiments can, be modified, or some of the technical features can be replaced equivalently; and these modifications and replacements shall belong to the scope of protection of the appended claims of the disclosure.

I claim:

1. A two-piece liquid crystal display (LCD) projector, comprising a red light source, a first spotlighting device, a blue light emitting diode (LED) light source, a second spotlighting device, a red and blue light converging device, a first focusing lens, a first LCD light valve module, a green LED light source, a third spotlighting device, a second focusing lens, a second LCD light valve module, a red, green and blue light converging device, a field lens and a projection lens;

wherein light emitted by the red light source and the blue LED light source is converged by the first spotlighting device and the second spotlighting device and then reaches the red and blue light converging device; the converged light is then converged by the red and blue light converging device and then reaches the first focusing lens to illuminate the first LCD light valve module; after being modulated by the first LCD light valve module, the modulated light is emitted to the red, green and blue light converging device; light emitted by the green LED light source passes through the third spotlighting device and then reaches the second focusing lens to illuminate the second LCD light valve module; the illuminating light is modulated by the second LCD light valve module and then emitted to the red, green and blue light converging device; after the red, green and blue light converging device converges the modulated light from the first and second LCD light valve modules, the converged light continues to be transmitted to the field lens and the projection lens; the light passes through the projection lens to be finally imaged on a screen.

2. The two-piece LCD projector of claim 1, wherein the sizes of windows of the first and second LCD light valve modules are the same.

\* \* \* \* \*